US007895974B2

(12) United States Patent
Brickell

(10) Patent No.: US 7,895,974 B2
(45) Date of Patent: Mar. 1, 2011

(54) LIVESTOCK FEEDER

(76) Inventor: Joanne Brickell, Spokane, WA (US)

( * ) Notice: Subject to any disclaimer, the term of this patent is extended or adjusted under 35 U.S.C. 154(b) by 470 days.

(21) Appl. No.: 11/965,601

(22) Filed: Dec. 27, 2007

(65) Prior Publication Data
US 2008/0156270 A1 Jul. 3, 2008

Related U.S. Application Data

(60) Provisional application No. 60/882,137, filed on Dec. 27, 2006.

(51) Int. Cl.
A01K 5/01 (2006.01)
(52) U.S. Cl. ........................ 119/61.2; 119/60
(58) Field of Classification Search ............... 119/61.2, 119/58, 61.1, 60; 414/24.6, 24.5, 25
See application file for complete search history.

(56) References Cited

U.S. PATENT DOCUMENTS

| 127,563 | A | * | 6/1872 | Carlin | 119/60 |
| 195,351 | A | * | 9/1877 | Crabb | 119/60 |
| 247,346 | A | | 2/1881 | Hendrick | |
| 376,529 | A | * | 1/1888 | Kline | 119/60 |
| 492,473 | A | * | 2/1893 | Reid | 119/60 |
| 564,788 | A | * | 7/1896 | Hermany et al. | 119/60 |
| 727,925 | A | * | 5/1903 | Faulkner | 119/58 |
| 763,951 | A | * | 7/1904 | Bethea | 119/61.3 |
| 1,090,286 | A | * | 3/1914 | Crowell | 119/60 |
| 1,421,142 | A | * | 6/1922 | Asaturian | 119/68 |
| 1,580,165 | A | * | 4/1926 | Piller, Sr. | 206/252 |
| 2,296,215 | A | * | 9/1942 | Layher | 312/306 |
| 3,388,677 | A | * | 6/1968 | MacKay | 108/136 |
| 3,834,353 | A | * | 9/1974 | Groezinger | 119/60 |
| 4,089,301 | A | * | 5/1978 | Harden | 119/60 |
| 4,193,378 | A | * | 3/1980 | Harden | 119/60 |
| 4,294,197 | A | * | 10/1981 | Snel et al. | 119/60 |
| 4,976,222 | A | | 12/1990 | Cooke | |
| 5,000,122 | A | * | 3/1991 | Smith | 119/58 |
| 5,067,442 | A | * | 11/1991 | Schilling | 119/60 |
| 5,394,832 | A | | 3/1995 | Briley | |
| 5,509,377 | A | * | 4/1996 | Franklin | 119/60 |
| 5,899,170 | A | * | 5/1999 | Muckler | 119/58 |
| 5,947,055 | A | | 9/1999 | Cross | |
| 6,006,696 | A | * | 12/1999 | Mann et al. | 119/60 |
| 6,431,117 | B1 | * | 8/2002 | Rauch | 119/58 |
| 6,481,373 | B2 | | 11/2002 | Swetzig | |
| 6,557,490 | B1 | | 5/2003 | Vaughn | |
| 7,117,817 | B2 | | 10/2006 | Overstreet | |
| 7,152,551 | B1 | | 12/2006 | Fomby | |
| 7,204,201 | B2 | | 4/2007 | Leombruno | |
| 7,284,500 | B2 | | 10/2007 | Denny et al. | |

* cited by examiner

Primary Examiner—Yvonne R. Abbott
(74) Attorney, Agent, or Firm—Wells St. John P.S.

(57) ABSTRACT

A livestock feeder is provided having a receptacle, a grate, a platform and an elevator mechanism. The receptacle has a chamber and an open mouth portion communicating with the chamber. The grate encompasses the open mouth portion. The platform is provided in the chamber for supporting livestock feed. The elevator mechanism is provided between the receptacle and the platform to urge the platform within the receptacle toward the grate to press the livestock feed against the grate.

20 Claims, 12 Drawing Sheets

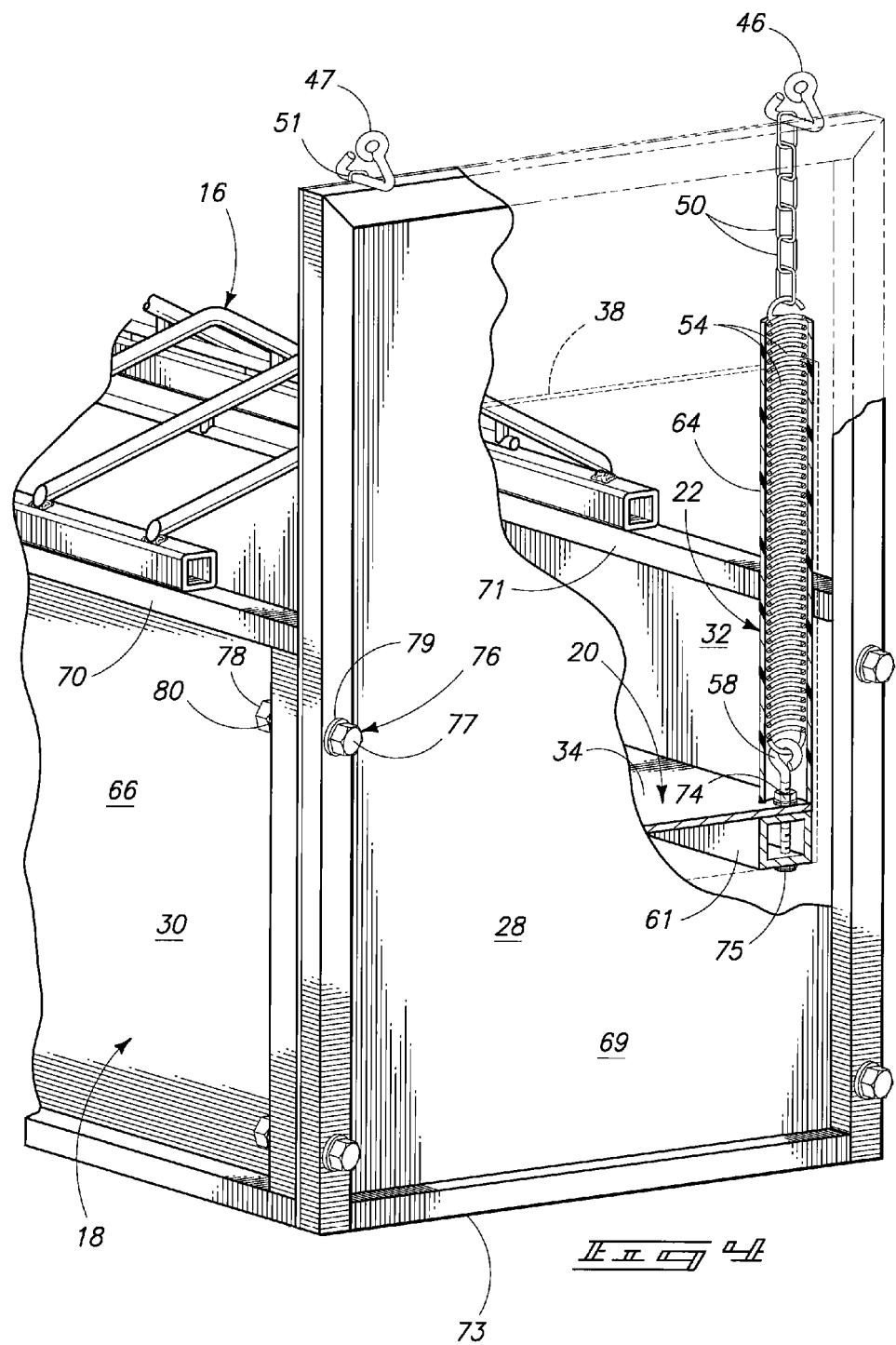

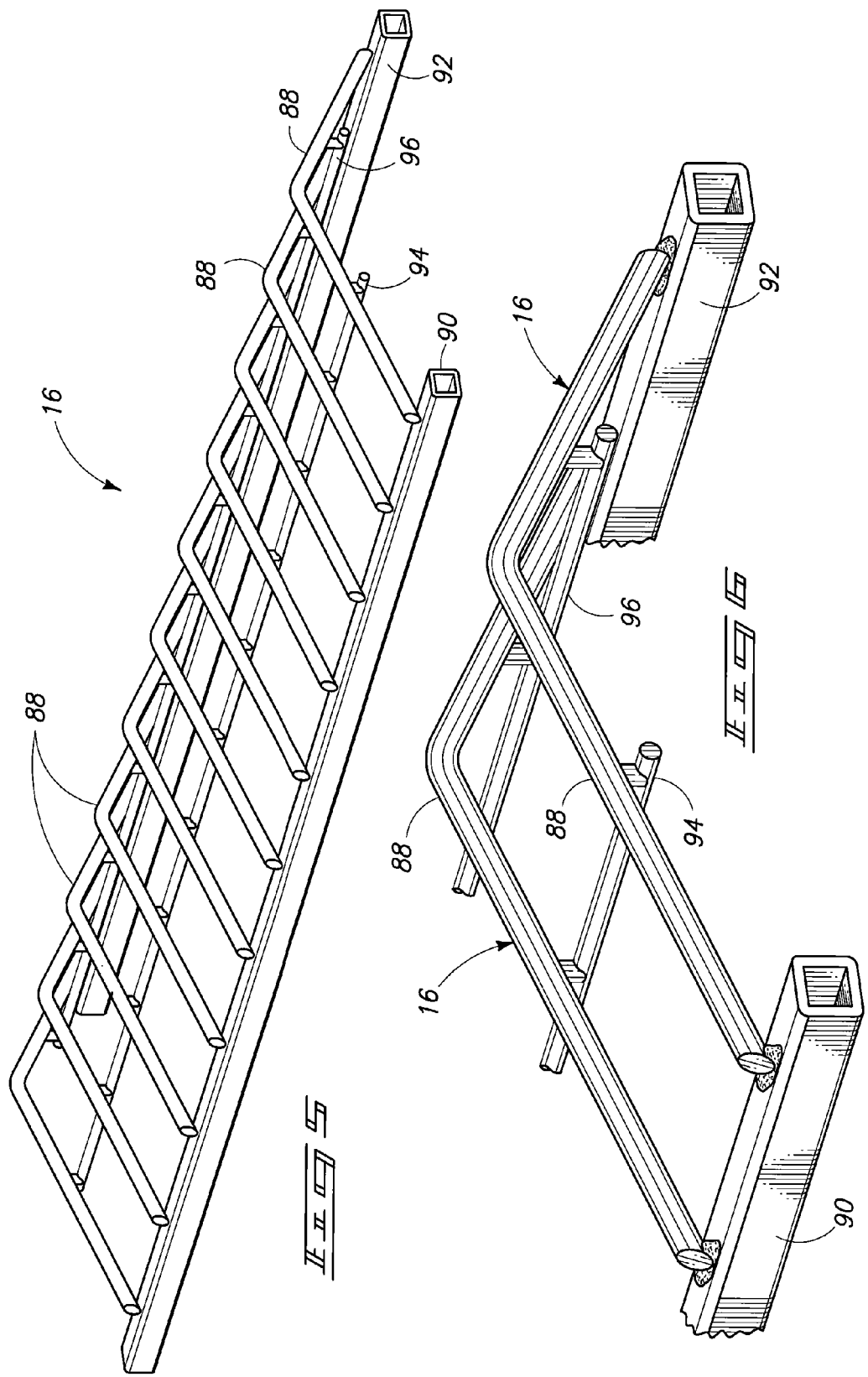

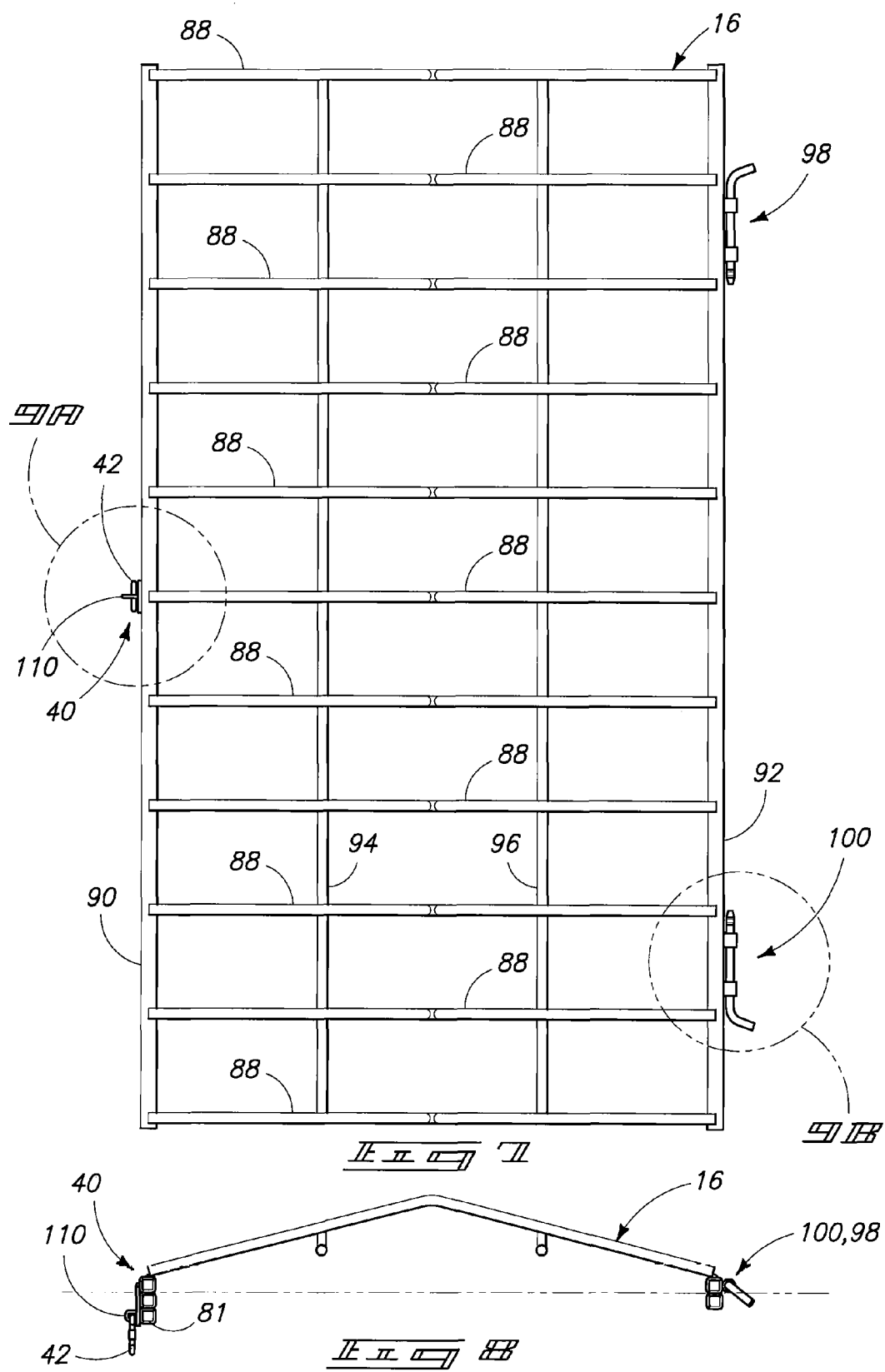

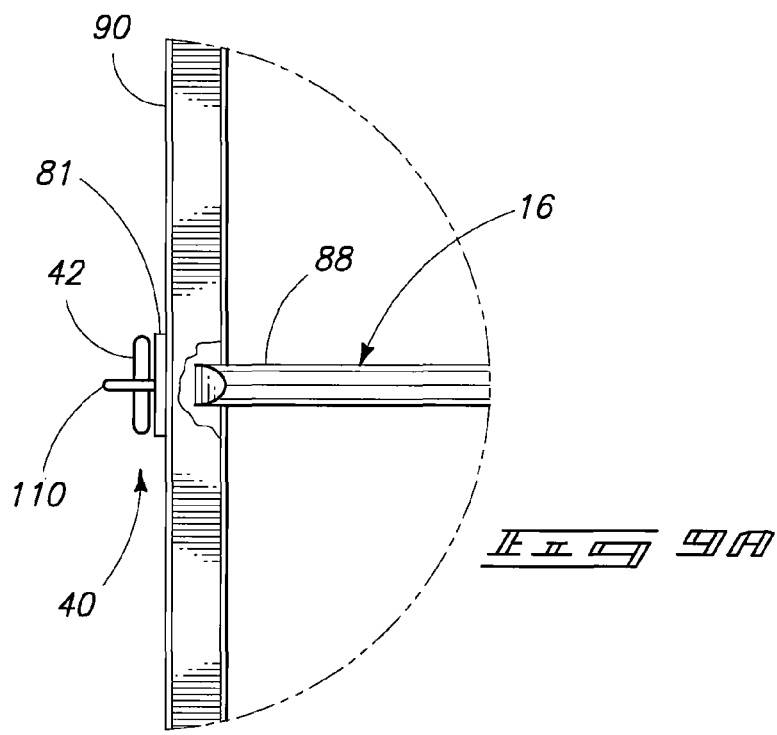
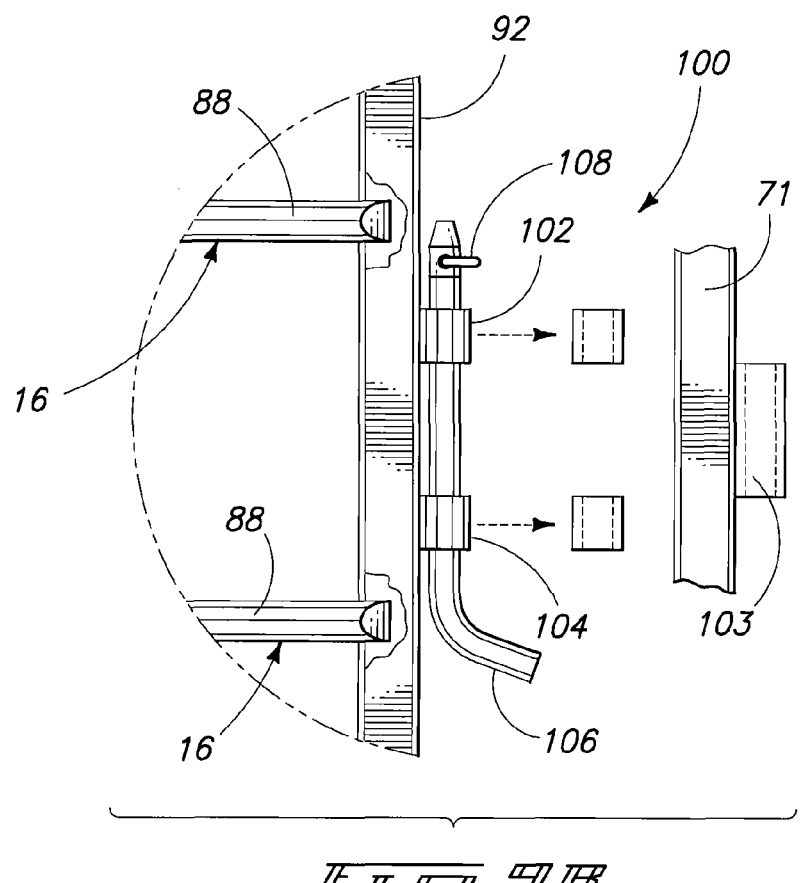

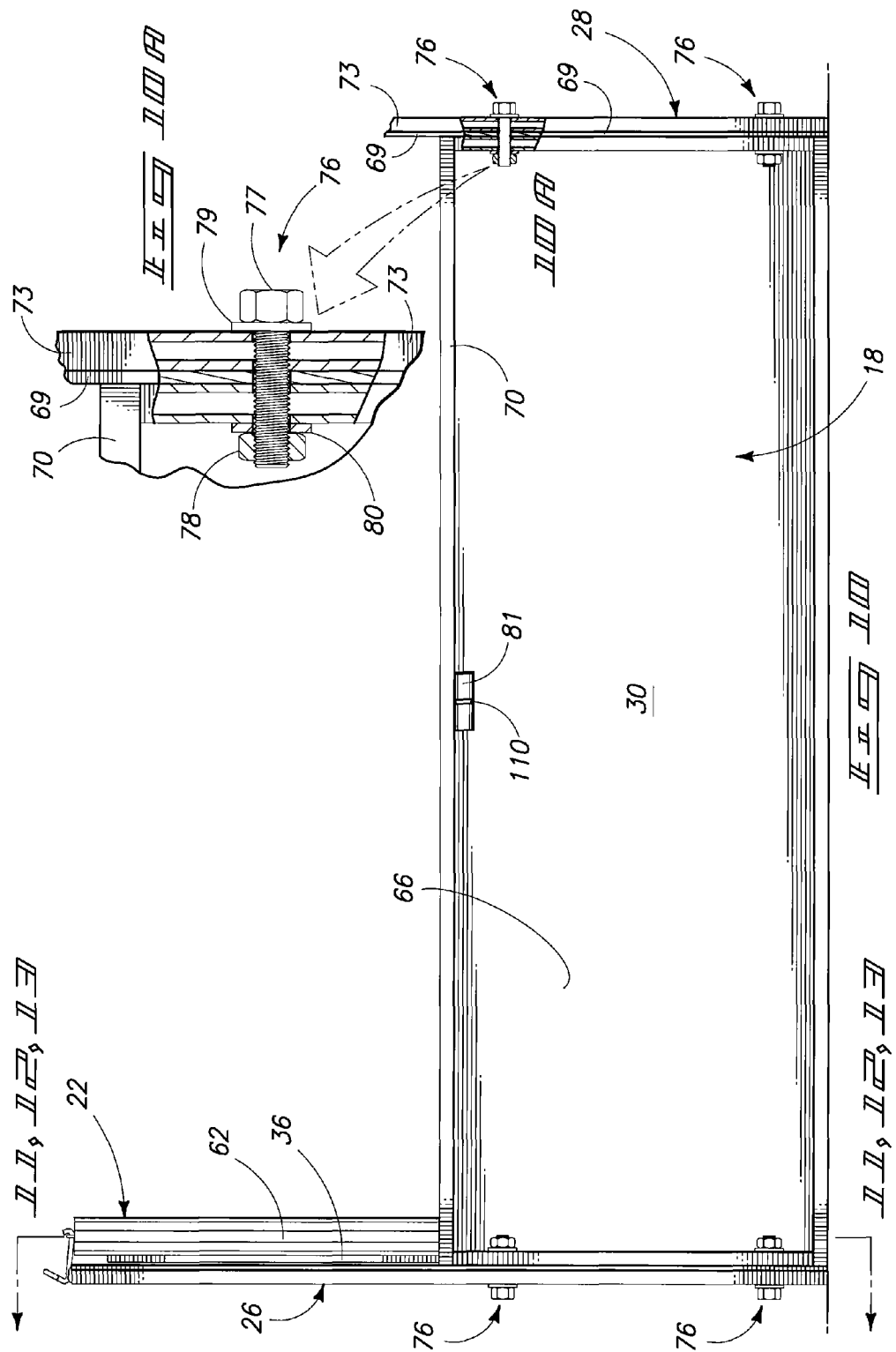

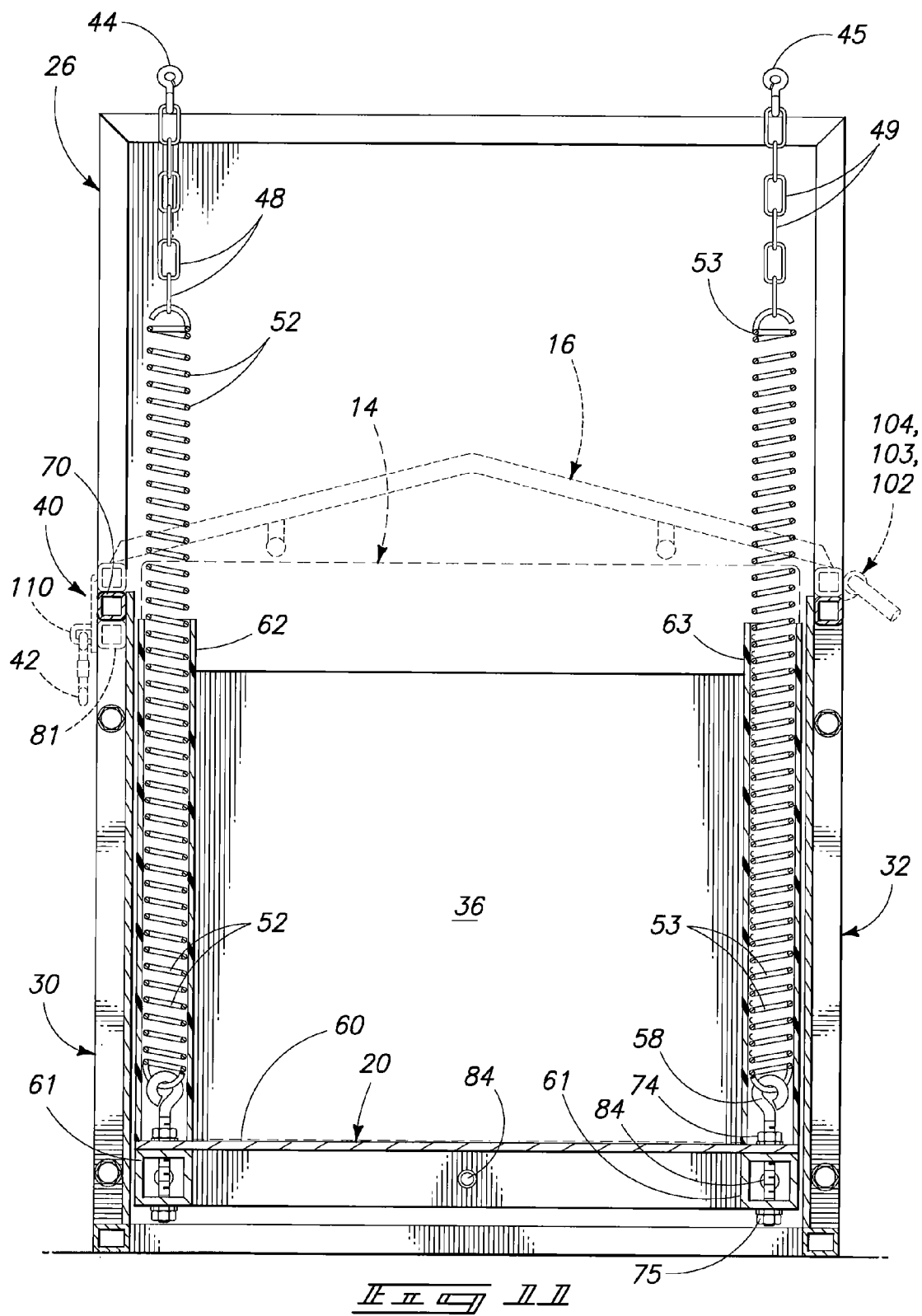

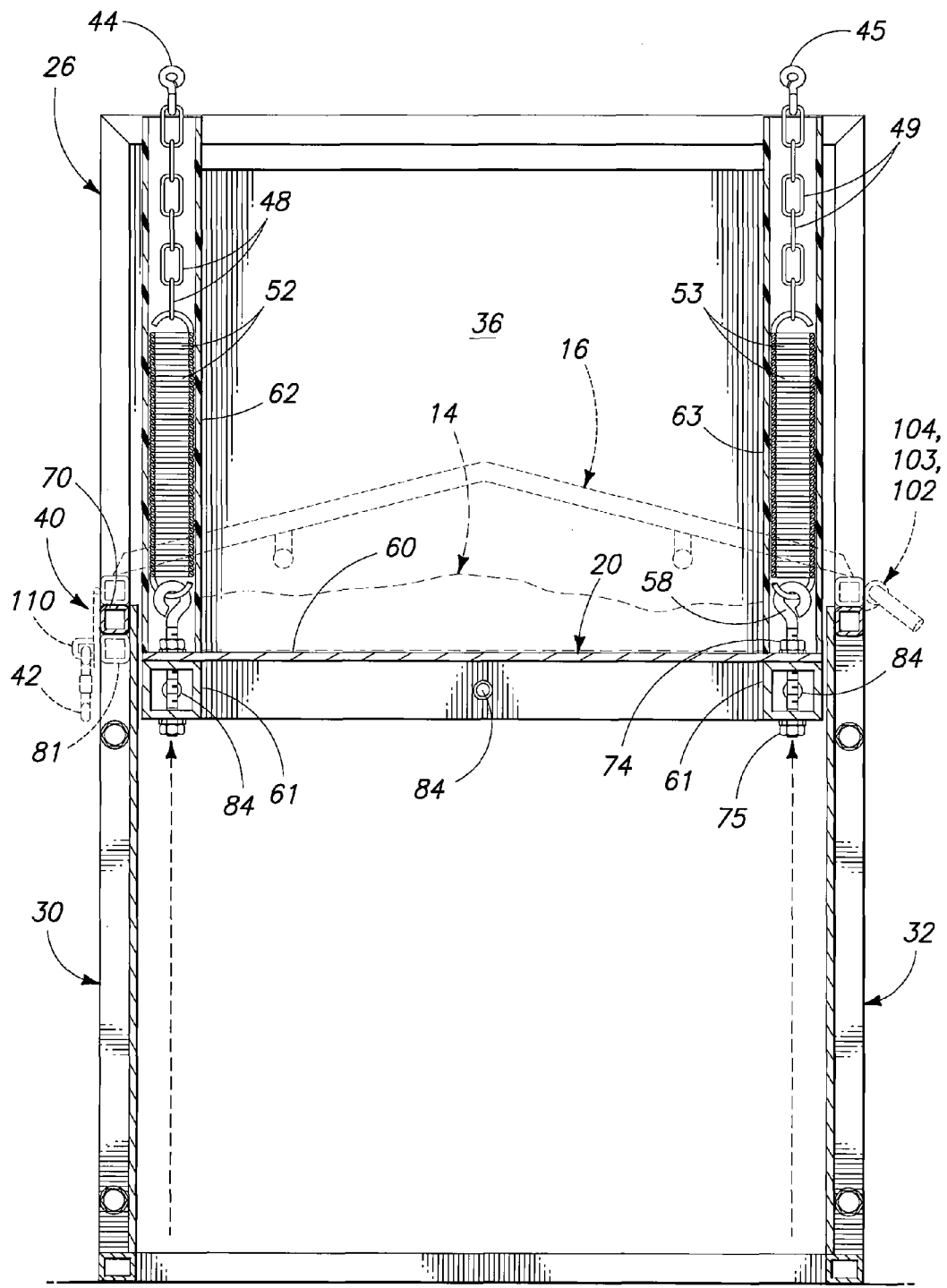

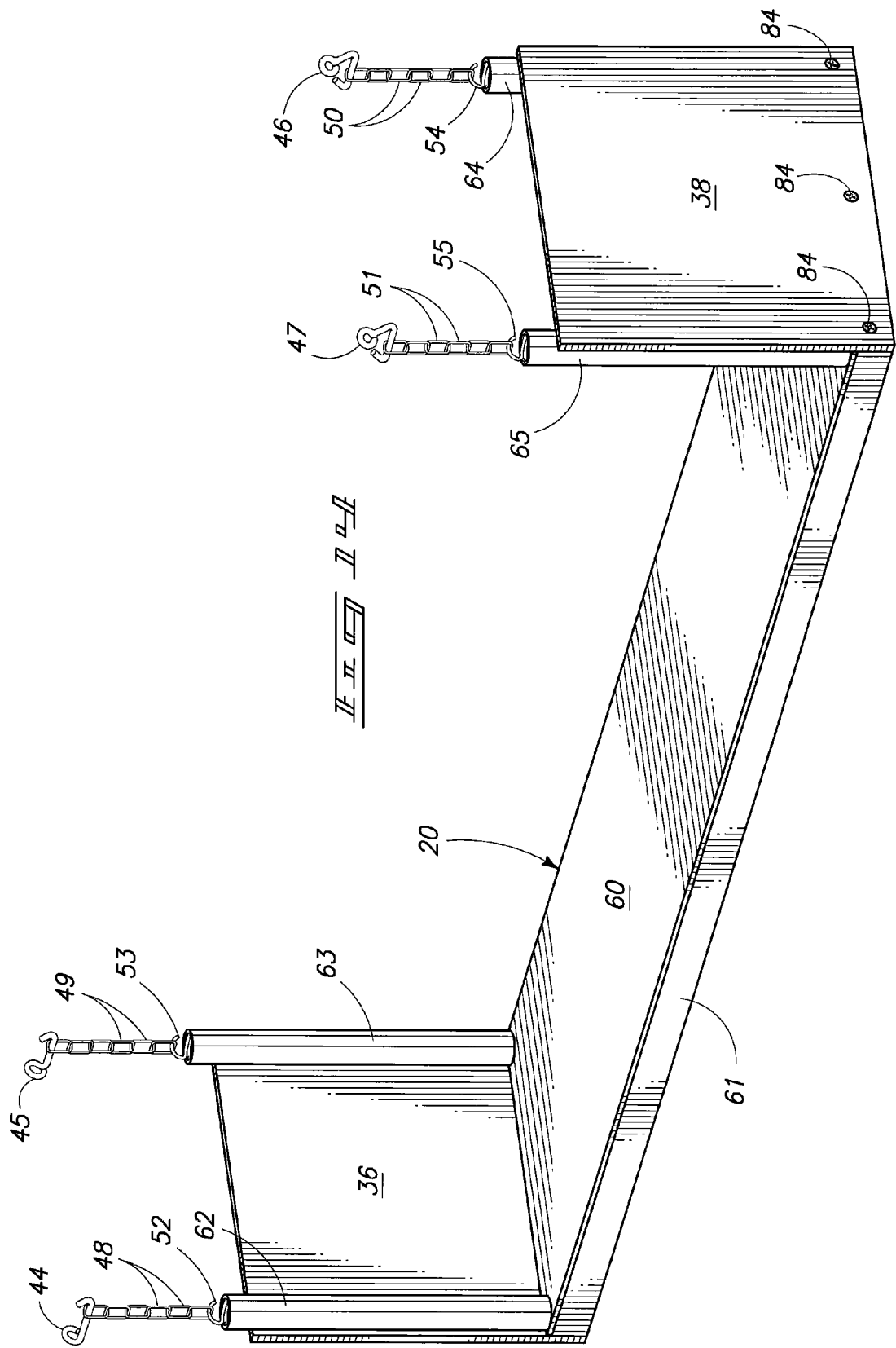

LIVESTOCK FEEDER

RELATED PATENT DATA

This application claims priority from U.S. Provisional Patent Application Ser. No. 60/882,137, which was filed Dec. 27, 2006, and which is incorporated by reference herein.

TECHNICAL FIELD

This invention pertains to dispensing of animal feed. More particularly, the present invention relates to animal feeders designed to dispense hay to livestock and animals.

BACKGROUND OF THE INVENTION

The feeding of livestock and animals by farmers or ranchers requires significant manpower and leads to a significant amount of waste. More particularly, the feeding of livestock with hay bales results in considerable waste. For example, feeding cattle and horses tend to break up individual hay bales in order to pick selected parts of the hay from the bale. In the process, portions of the bale drop to the ground where they are trampled into the soil and are not eaten by the animals. As a result, ranchers need to provide more hay bales to feed a designated amount of animals which increases the work necessary to feed such animals. Attempts have been made to use feed racks and dispensing feed bins to solve this problem.

Feed racks have been known for feeding livestock. U.S. Pat. Nos. 247,346 and 5,000,122 provide two typical examples of feed racks that dispense hay to livestock, such as horses. However, each of these feed racks has an open top portion that enables an animal to retrieve feed material in an un-metered manner which will still lead to feed material being dropped onto the ground where it is wasted.

Dispensing feed racks and bins are also known. U.S. Pat. Nos. 5,394,832; 6,481,373; and 7,204,201 provide examples of fed racks and bins that meter delivery of feed material to an animal. However, these racks and bins either are not capable of dispensing bales of hay, require tactile manipulation of a feed stopper mechanism, or require the use of a timing or control mechanism to meter delivery of feed material to an animal. Such constructions complicate the design and operation of the device, as well as increase the costs and complexity of managing delivery of feed material to animals.

Accordingly, improvements are needed in the design and implementation of animal feeders to maximize ingestion of feed material by an animal using the animal feeder and minimize waste of such material which might otherwise be dropped onto the ground.

SUMMARY OF THE INVENTION

A livestock feeder is provided with a feed mechanism that delivers livestock feed against a grate that meters consumption of the feed by livestock.

According to one aspect, a livestock feeder is provided having a receptacle, a grate, a platform and an elevator mechanism. The receptacle has a chamber and an open mouth portion communicating with the chamber. The grate encompasses the open mouth portion. The platform is provided in the chamber for supporting livestock feed. The elevator mechanism is provided between the receptacle and the platform to urge the platform within the receptacle toward the grate to press the livestock feed against the grate.

According to another aspect, an animal feeder is provided having a housing, a grate, a platform, and a lift mechanism. The housing has an opening. The grate covers the opening. The platform is supported for movement within the housing. The lift mechanism supports the platform within the housing to urge the platform toward the grate to deliver a hay bale on the platform into engagement with the grate.

According to yet another aspect, a hay feeder is provided having a manger, a grate, a base frame and a spring. The manger has an upstanding outer peripheral wall that defines an opening along an upper end. The grate is mounted atop the wall over the opening. The base frame is supported for vertical movement within the manger. The spring is mounted to the manger and the base frame to urge the base frame toward the opening.

BRIEF DESCRIPTION OF THE DRAWINGS

Preferred embodiments of the invention are described below with reference to the following accompanying drawings.

FIG. 4 is an enlarged partial perspective view in breakaway of the animal feeder of FIG. 3 showing construction details of the elevator mechanism acting on the feeder platform.

FIG. 5 is a perspective view of the top grate for the animal feeder of FIGS. 1 and 3-4.

FIG. 6 is an enlarged partial perspective view of the grate of FIG. 5.

FIG. 7 is a plan view of the top grate of FIGS. 5-6.

FIG. 8 is an end elevation view of the top grate of FIG. 7.

FIG. 9A is an enlarged view of a latch assembly taken from the encircled region 9A of FIG. 8.

FIG. 9B is an enlarged view of a hinge assembly and pin taken from the encircled region 9B of FIG. 8.

FIG. 10 is a front elevation view in partial breakaway illustrating assembly of the outer housing.

FIG. 11 is a vertical sectional view taken along line 11-11 of FIG. 10 and illustrating the feeder platform in a fully loaded position.

FIG. 13 is a vertical sectional view taken along line 13-13 of FIG. 10 and illustrating the feeder platform in an empty position.

FIG. 14 is a perspective view of the feeder platform and elevator mechanism for the animal feeder of FIGS. 1 and 3-13.

DETAILED DESCRIPTION OF THE PREFERRED EMBODIMENTS

Figure 1:
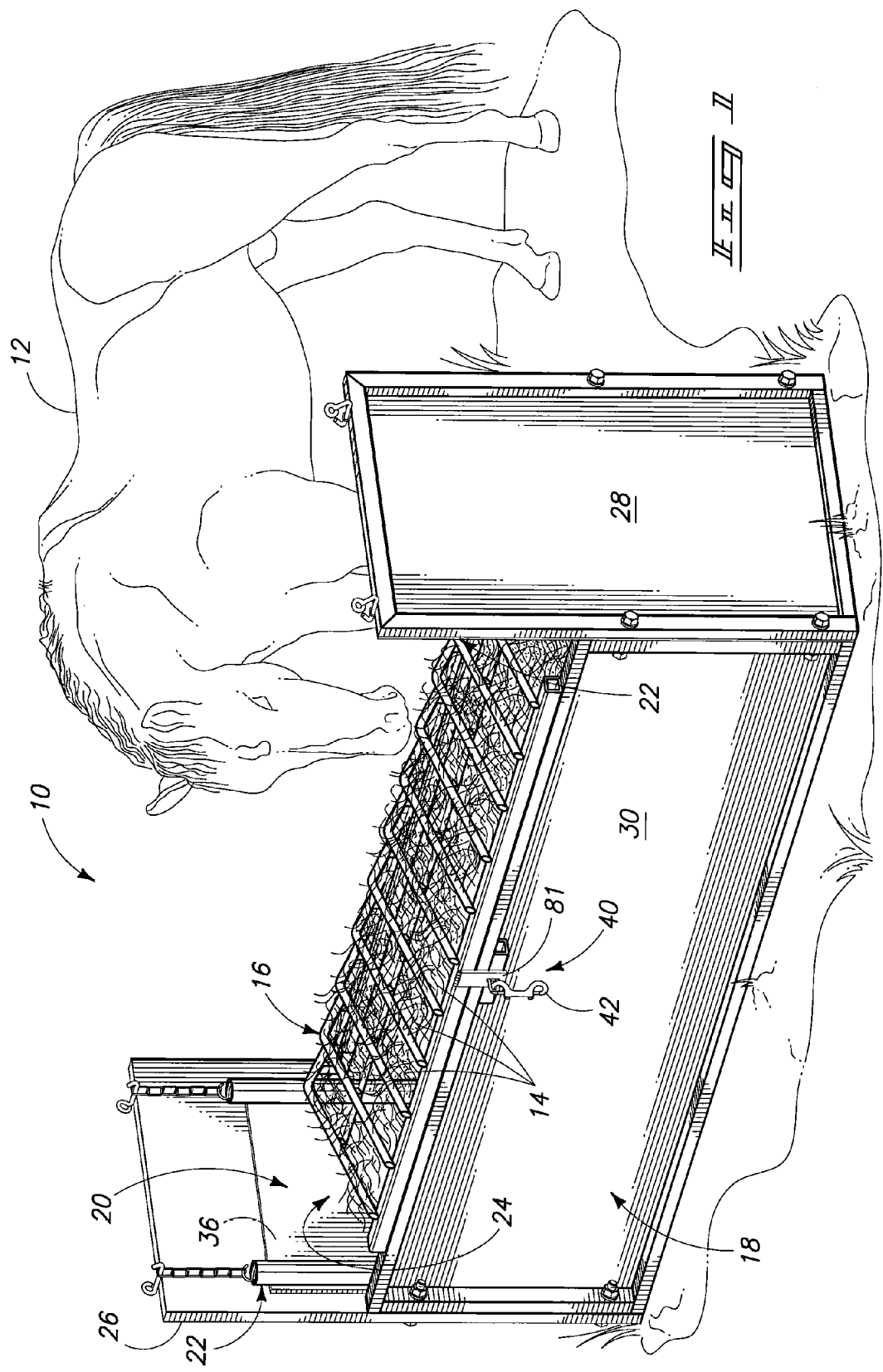
FIG. 1 is a perspective view of an animal feeder optimized for feeding horses, according to one aspect of the present invention.

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention comprising an animal feeder identified by reference numeral 10. While the invention is described by way of preferred embodiments, it is understood that the description is not intended to limit the invention to such embodiments, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 2:
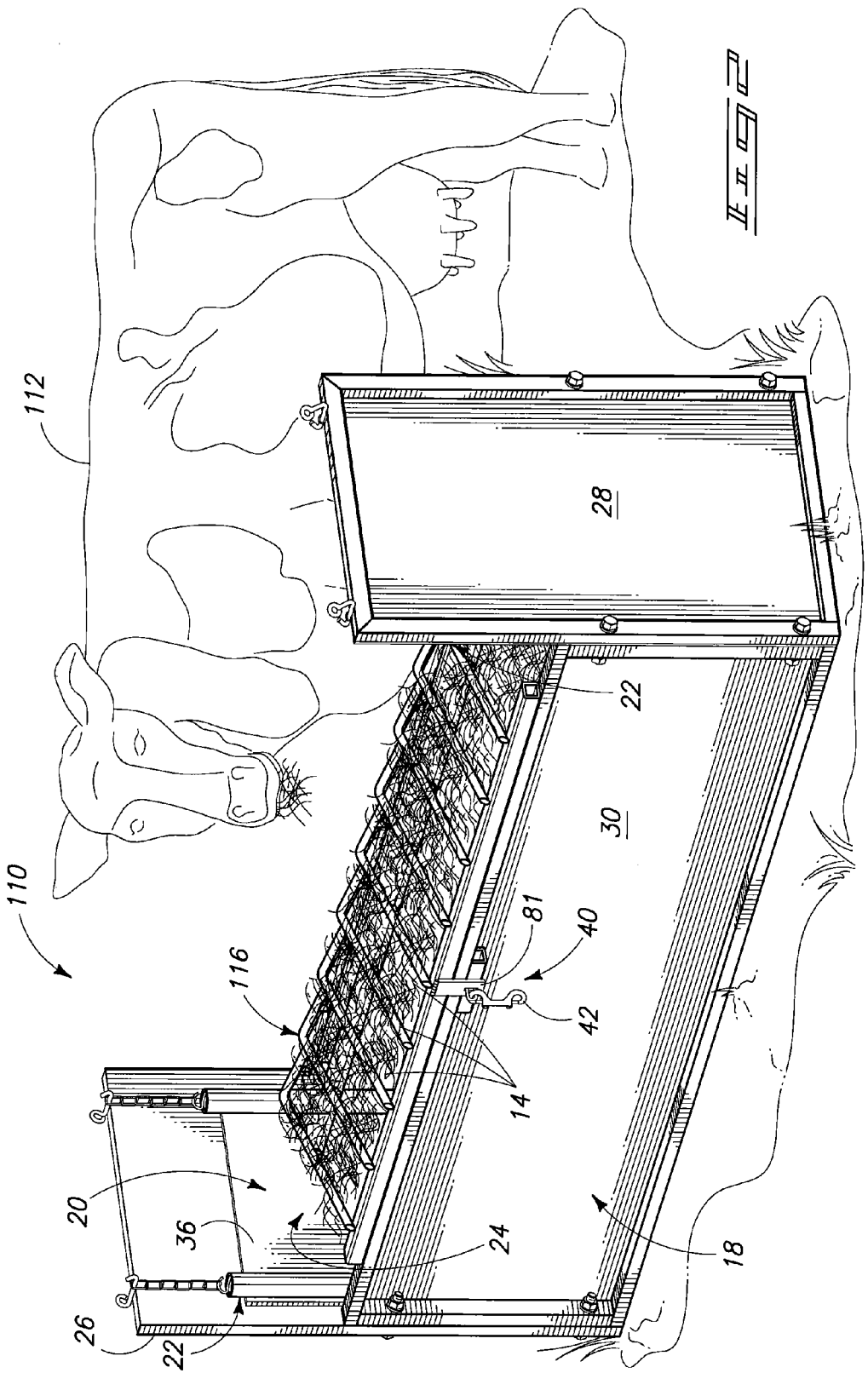
FIG. 2 is a perspective view of an animal feeder optimized for feeding cows, according to another aspect of the present invention.

FIG. 1 illustrates an animal feeder 10 optimized for feeding an adult horse 12 with feed material comprising a hay bale 14 by way of a top grate 16 that meters the delivery of hay through grate 16 when a horse 12 attempts to eat the hay. Appropriate sizing and positioning of the individual members of grate 16 will meter and regulate delivery of hay to horse 12 in a desired manner. Accordingly, the sizing and dimension of apertures provided in grate 16 can be modified by merely replacing grate 16 with an alternative grate. For example, grate 116 is provided in an embodiment animal feeder 110 depicted in FIG. 2 which is suitable for use by a cow 112. However, the only difference in construction is the sizing and positioning of members on grate 116 relative to grate 16 (of FIG. 1). It is understood that grates 16 and 116 are interchangeable.

More particularly, animal feeder 10 of FIG. 1 includes a housing, or manger 18 having a plurality of upstanding outer peripheral walls defining an opening 24 along an upper end. The outer peripheral walls are provided by a front panel 30, a back panel 32 (see FIG. 3) and a pair of opposed end panels 26 and 28. Grate 16 is mounted atop front panel 30 and back panel 32, covering opening 24. An elevated feeder platform 20 is supported for vertical movement within manger 18. An elevator mechanism, including a spring, is mounted to manger 18 and platform 20 so as to urge platform 20 toward opening 24, thereby compressing a bale of hay against an underside of grate 16. Grate 16 is pivotably affixed onto a top edge of back panel 32 via a pair of hinge assemblies 98 and 100 (see FIG. 7). A front edge of grate 16 is releasably secured onto a top edge of front panel 30 using a latch assembly, or hasp 40 and a clip 42.

Figure 3:
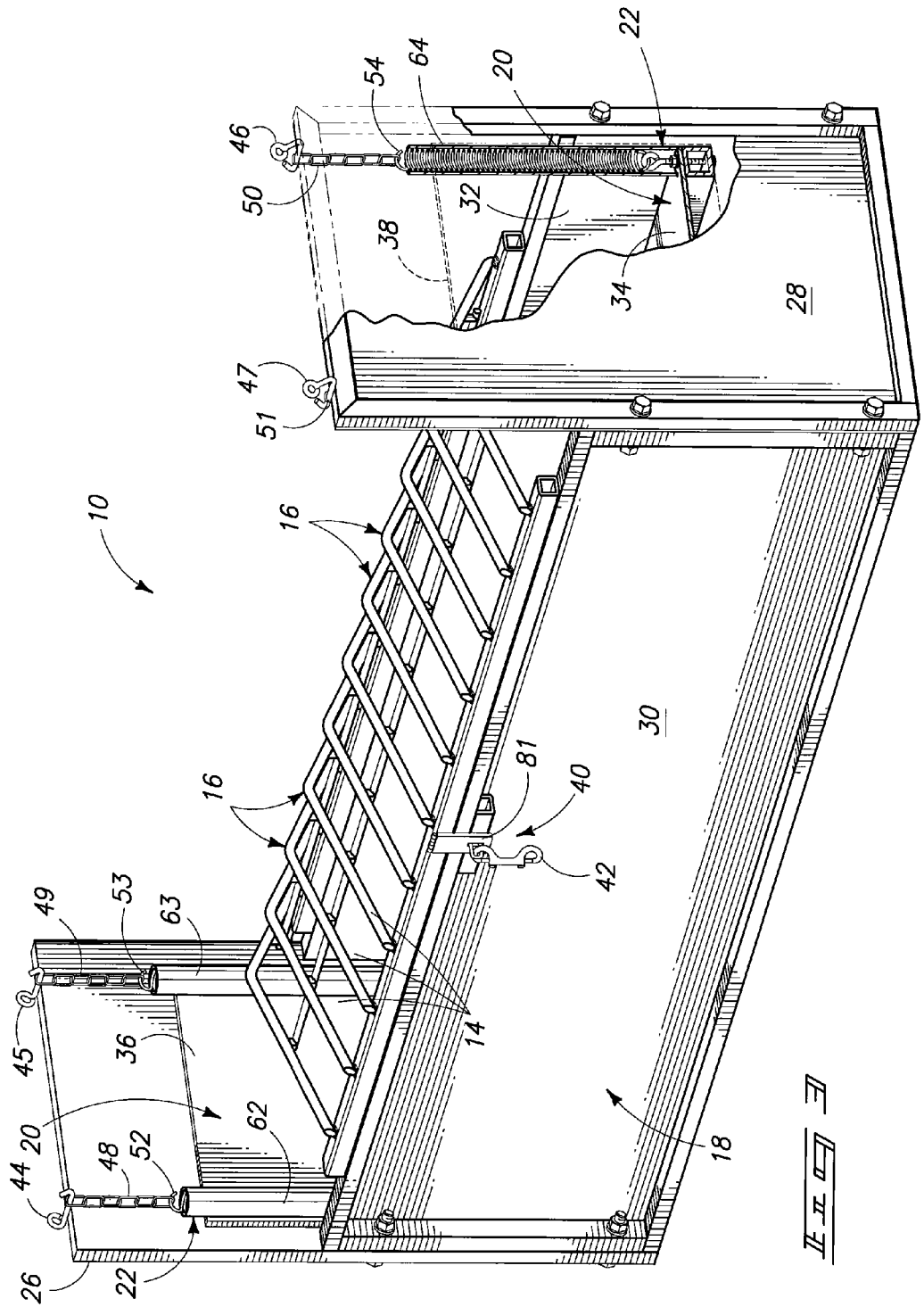
FIG. 3 is a perspective view in partial breakaway of the animal feeder of FIG. 1.

As shown in FIG. 3, panels 30 and 32 of housing 18 are provided opposite one another, whereas panels 26 and 28 are also provided opposite one another. Additionally, elevated feeder platform 20 is urged upwardly by elevator mechanism 22. As shown in FIG. 3, platform 20 is shown in a semi-loaded configuration while omitting a bale of hay from therein in order to facilitate viewing. It is understood that elevator mechanism 22 would raise platform 20 to an uppermost position adjacent grate 16 if there were no bale of hay provided atop platform 20.

Platform 20 includes a base 34 and a pair of end panels 36 and 38 affixed to opposite ends of base 34. Grate 16 is pivotably affixed along a back edge onto a top edge of panel 32, whereas a front edge of grate 16 is releasably affixed onto a top edge of front panel 30 via latch assembly, or hasp 40 and clip 42. An eyelet 110 of hasp 40 is welded onto a short section of square steel tube 81 that is welded to a bottom edge of tube 70 and sheet 66 (see FIG. 11).

Elevator mechanism 22 includes coil springs 52-53 and 54-55 (see FIG. 14) which are carried by end panels 36 and 38, respectively, via steel hooks 44-45 and 46-47. Hooks 44-45 and 46-47 are respectively welded atop panels 26 and 28. A short segment of chain 48-49 and 50-51 (see FIG. 14) connects the top end of each spring 52-53 and 54-55 onto respective hook 44-45 and 46-47. A bottom end of each spring is then connected to platform base 34 such that the respective spring is stretched in tension when base 34 is depressed downwardly from grate 16. Accordingly, the respective springs tend to urge base 34 upwardly to continually urge feed material placed thereatop into engagement with a bottom surface of grate 16. Furthermore, individual springs 52-53 and 54-55 are protected by plastic tubes 62-63 and 64-65 (see FIG. 14) in order to minimize the risk that an animal might get their tongue stuck between the individual coils of a respective spring while feeding.

FIG. 13 illustrates in greater detail the assembly of individual panels that form housing, or manger 18. More particularly, end panel 28 is affixed onto front panel 30 and rear panel 32 along respective edges using a plurality of fastener assemblies 76 that are received through respective holes in each panel. Each fastener assembly 76 comprises a bolt 77, a respective threaded nut 78, a lock washer 79 and a washer 80. Alternatively, it is understood that the respective panels can be joined together using any fastening technique, including by welding together the edges of such panels. Additionally, it is understood that each of the panels is constructed using a piece of sheet steel and a tubular steel frame. More particularly, panel 28 is constructed by welding together square steel tubing to provide a peripheral frame 73 that is welded along outer edges onto a rectangular piece of sheet steel 69. Likewise, front panel 30 is formed by welding a square tubing frame 70 along a peripheral edge of sheet steel 66. One suitable size of square steel tubing is three quarters of an inch across each side.

Further details of each spring are provided in FIG. 4. More particularly, a selected spring 54 is shown connected onto a hook 46 via a segment of steel chain 50. Individual coils of coil spring 54 are shown stretched such that a bottom end of coil spring 54 is connected onto an eye bolt 58. Eye bolt 58 secures along a threaded section with a pair of nuts 74 and 75 which pass through an aperture in a square tube frame 61 provided on a bottom of platform 20. A plastic tube 64 is then assembled about spring 54 to protect an animal that is eating feed there adjacent. Springs 52-53 and 55 are similarly constructed and assembled.

FIG. 5 illustrates the construction of grate 16. According to one construction, grate 16 is formed from a plurality of parallel and spaced apart v-shaped steel rods 88 that are welded together in spaced apart and parallel relation via longitudinal cylindrical rods 94, 96 and longitudinal extending square tubes 90, 92. Rods 94, 96 and square tubes 90, 92 are each formed from steel. Alternatively, any suitable structural material can be used to form components of grate 16.

FIG. 6 illustrates in greater detail the manner in which individual v-shaped bars 88 are welded onto tubes 90, 92 and rods 94, 96. Optionally, bars 88 can be constructed from either straight or curved segments.

FIG. 7 illustrates in plan view the construction details of grate 16, showing the parallel relation between v-shaped bars 88. Longitudinal tubes 90, 92 and rods 94, 96 extend perpendicularly to bars 88. Accordingly, bars 88 are equally spaced apart so as to define similarly sized eating apertures therebetween which provide for metering of food as an animal attempts to draw food from atop of a bale of hay through grate 16. Further details are shown in FIG. 8.

Tube 92 is provided along a rear edge of grate 16. A pair of hinge assemblies 98 and 100 are welded onto tube 92, as shown in FIGS. 7 and 8. Similarly, a respective portion of a latch assembly 40 is welded onto tube 90 along a front edge of grate 16. A remaining portion of latch assembly 40; namely eyelet 110 is welded onto tube 81 (see FIG. 1).

FIG. 9A illustrates in greater detail the respective components of latch assembly 40. More particularly, a clip 42 is inserted into eyelet 110 that is welded onto tube 81 (see FIG.

10). Tube 81 is welded onto an edge of tube 90 (see FIG. 10). FIG. 9B further illustrates construction of an exemplary hinge assembly 100. More particularly, a pair of cylindrical tubes 102 and 104 are welded onto tube 92. Hinge pin 106 is inserted into tubes 102 and 104 (as well as tube 103 on frame 71) after which a clip 108 passes through an aperture in pin 106 to lock pin 106 into tubes 102 and 104. It is understood that tube 103 is welded atop a top edge of back panel 32 which is positioned between tubes 102 and 104 to provide a hinge there along. Likewise, a similar tube is welded onto back panel 32 for hinge assembly 98 (notch on).

FIG. 10 illustrates the manner in which end panels 26 and 28 are affixed onto front panel 30 (as well as rear panel 32 (see FIG. 3)). Pairs of fastener assemblies 76 are used to bolt together end panel 26 to each of front panel 30 and rear panel 32. Likewise, pairs of fastener assemblies 76 are used to join together panel 28 with front panel 30 and rear panel 32.

More particularly, FIG. 10A illustrates one suitable fastener assembly 76 comprising a bolt 76, a nut 78, a lock washer 79 and a washer 80. A pair of matching bores, or through-holes are provided through the respective square tubes that form square tube frames 70 and 73, respectively. Optionally, adjacent panels can be welded together. Each panel is formed from a piece of sheet steel that is welded along an outer periphery to a square tube frame. For example, panel 30 is formed by welding together square tube frame 70 to sheet 66 (see FIG. 10).

FIG. 11 illustrates feeder platform 20 in a position that is taken when a new bale of hay has been loaded thereon (not shown) and individual springs are stretched to their fully extended position. For such case, a bale of hay is pressed underneath grate 16 as tension in the coil springs 52, 53 (as well as 54, 55) upwardly bias platform sheet 60 and frame 61.

Figure 12:
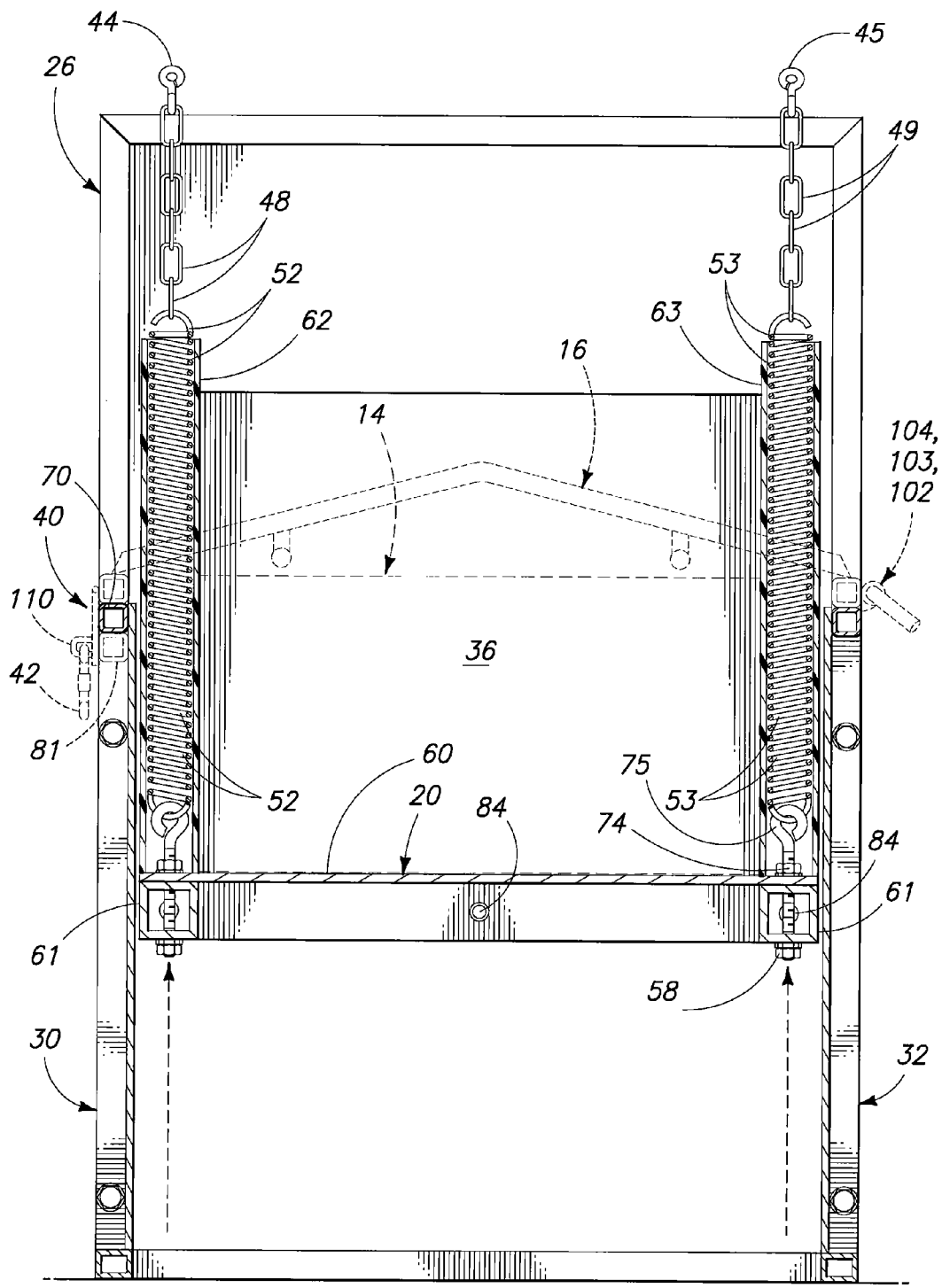
FIG. 12 is a vertical sectional view taken along line 12-12 of FIG. 10 and illustrating the feeder platform in a half loaded position.

FIG. 12 illustrates feeder platform 20 in a slightly elevated position corresponding with a bale of hay that has been partially eaten by an animal. The position of sheet 60 is provided by the depth of a bale of hay still existing atop sheet 60 which is engaged against a bottom surface of grate 16. The bale has been omitted in order to facilitate viewing of construction details of the manger.

FIG. 13 further illustrates positioning of feeder platform 20 when a bale of hay has been substantially depleted, thereby raising sheet 20 in close proximity with an underside surface of grate 16. The stiffness of springs 52, 53 (and 54, 55 of FIG. 14) is sufficient to elevate sheet 60 to a height that engages a top-most surface of a bale of hay (loaded atop sheet 6) against a bottom surface of grate 16 from the time that a new bale of hale is placed onto sheet 60 to the time that the bale has been completely eaten by an animal. By urging the bale against grate 16, an animal has to work more to retrieve hay from the bale, which reduces the likelihood that the animal retrieves more hay from the bale than they can eat, thereby reducing the amount of hay that is dropped onto the ground (and wasted).

FIG. 14 illustrates construction of elevated feeder platform 20, removed from the manger. As shown, hooks 40-47 retain chains 48-51. Coil springs 52-55 are respectively affixed to a bottom end of each of chains 48-51. Protective plastic tubes 62-65 respectively cover each spring 52-55 so that an animal is less likely to trap their tongue between coils of the spring as the spring retracts upwardly, thereby reducing the spacing between adjacent coils.

Feeder platform 20 includes platform sheet 60 and square tube frame 61 welded along an under periphery thereof. It is understood that four longitudinal sections of square steel tubing are welded together, and further welded onto a bottom surface of a rectangular piece of sheet steel 60. Panels of the manger are similarly formed. Subsequently, individual end panels 36 and 38, each comprising a piece of sheet steel, are secured with threaded fasteners 84 into tubing frame 61. Threaded bores (or insert nuts) are provided in frame 61 for receiving fasteners 84. Preferably, fasteners 84 have recessed heads.

It is understood that the manger depicted above can have other shapes and configurations. It is also understood that the opening can have an alternative shape, and does not need to be necessarily provided along a topmost edge of the manger. For example, the platform and elevator mechanism can be configured to move the platform in angled or horizontal directions, with the grate being provided in a corresponding alternative orientation. It is also understood that alternative construction materials can be used to form the manger, such as wood, plastic, or other suitable structural materials. Furthermore, it is understood that the elevator mechanism can be provided by kinematic linkages, hydraulic or pneumatic cylinders, actuators, or any other suitable device capable of urging animal feed against a grate. Even furthermore, such device can be alternatively controlled with a control system that ensures delivery of feed material against the grate.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A livestock feeder, comprising:
   a receptacle having a front panel, a rear panel, and a pair of end panels affixed along respective edges at opposite ends of the front panel and the rear panel to provide a chamber and an open mouth portion communicating with the chamber;
   a plurality of spring retainers each affixed proximate a top corner of each end panel;
   a grate encompassing the open mouth portion;
   a platform having a rectangular base provided in the chamber for supporting livestock feed; and
   a plurality of coil springs each affixed to a respective one of the spring retainers at a top end and provided between the receptacle and the platform to urge the platform within the receptacle toward the grate to press the livestock feed against the grate.

2. The livestock feeder of claim 1, wherein the receptacle comprises a rectangular housing sized to receive a rectangular hay bale.

3. The livestock feeder of claim 1, wherein the grate comprises a cage provided atop the open mouth portion of the receptacle.

4. The livestock feeder of claim 1, wherein the rectangular base of the platform comprises a horizontal, imperforate base supported for elevational positioning within the receptacle.

5. The livestock feeder of claim 1, wherein each of the coil springs is loaded under tension, acting between the platform and the receptacle to urge the platform toward the grate.

6. The livestock feeder of claim 5, wherein each coil spring is affixed to a respective corner of the platform along a first end, and each coil spring is affixed to the receptacle along a second end.

7. The livestock feeder of claim 1, further comprising a hinge provided along a first edge of the grate and a releasable latch provided along a second, opposed edge of the grate.

8. An animal feeder, comprising:
a housing having a front panel, a rear panel, and opposed side panels affixed together to form a rectangular chamber having a top-most rectangular opening sized to receive a rectangular bale of hay;
a grate covering the opening;
a platform having a rectangular base and a pair of opposed vertical panels each affixed to a respective opposite end of the base along a bottom edge and supported for movement within the housing; and
a lift mechanism having a plurality of coil springs each affixed between the platform and the housing supporting the platform within the housing and configured in a deformed state to urge the platform towards the grate to deliver a hay bale on the platform into engagement with the grate.

9. The animal feeder of claim 8, wherein each of the coil springs extends above the platform.

10. The animal feeder of claim 9, wherein the rectangular base includes a horizontal, imperforate panel.

11. The animal feeder of claim 8, wherein each of the coil springs is loaded under tension between the platform and the housing.

12. The animal feeder of claim 8, wherein the grate is pivotally affixed atop the housing between open and closed positions, and further comprising a latch for retaining the grate in the closed position atop the housing.

13. The animal feeder of claim 8, wherein the grate has a ridge line with a pair of opposed pitch surfaces.

14. A hay feeder, comprising:
a manger having a front panel, a rear panel, and a pair of end panels affixed along respective edges at opposite ends of the front panel and the rear panel to provide an upstanding outer peripheral wall defining an opening along an upper end, the end panels extending elevationally above the front panel and the rear panel;
a clip provided adjacent a top corner of each end panel;
a grate mounted atop the wall over the opening;
a base frame supported for vertical movement within the manger; and
four coil springs each mounted at a top end to a respective one of the clips and to a respective corner of the base frame, each spring provided with a length that places the respective spring in tension as the base frame is displaced downwardly from the grate so as to maintain feed on the base frame in engagement with the grate to urge the base frame toward the opening.

15. The hay feeder of claim 14, wherein the base frame comprises a rectangular panel and a tubular frame affixed adjacent a periphery of the panel.

16. The hay feeder of claim 15, wherein the base frame further comprises pair of end panels each affixed along a bottom edge to a respective end of the rectangular panel via the tubular frame.

17. The hay feeder of claim 15, wherein the panel is an imperforate, horizontal panel.

18. The hay feeder of claim 14, wherein each of the springs is mounted in tension above the base frame.

19. The hay feeder of claim 14, wherein the grate comprises a frame having parallel and transverse bars providing feeding apertures therebetween.

20. They hay feeder of claim 19, wherein the parallel bars are v-shaped so as to impart a roof shape to the grate having mirror-image faces each having an opposing pitch.

\* \* \* \* \*